United States Patent Office 3,189,505
Patented June 15, 1965

1

3,189,505
METHOD AND APPARATUS FOR FORMING
A PACKAGE
Edward C. Sloan, Augustus H. Eberman, and Hans A.
Jensen, Madison, Wis., assignors to Oscar Mayer & Co.,
Inc., Chicago, Ill., a corporation of Illinois
Filed Dec. 24, 1956, Ser. No. 630,194
34 Claims. (Cl. 156—244)

The present invention relates, generally, to innovations and improvements in packages and methods of forming the same utilizing polyvinylidene chloride films. Still further, the present invention relates to apparatus specifically adapted to form the packages in conformance with the packaging methods to be disclosed. More particularly, it relates to such innovations and improvements wherein advantage is taken of the unique properties of polyvinylidene chloride films in the supercooled condition to cohere or unite so as to form seals ranging from homogeneous integral seals to peelable or partable seals.

In referring to polyvinylidene chloride films it is intended to cover those films formed from vinylidene chloride-vinylchloride copolymers, such as "Saran" manufactured by Dow Chemical Co. of Midland, Michigan. Polyvinylidene chloride films along with several other well known types of synthetic films have been and are now being widely used in the packaging of many different types of products including food products. Packaging films of the synthetic variety are normally applied to the product and portions of the film brought into contact and fused together by the application of heat. The fused portion of the films surrounding the product provides an adequate seal particularly where food products subject to spoilage are packaged. Crystalline polymers of vinylidene chloride and various known polymers including vinylidene chloride have been formed into films for packaging purposes and have been found to be quite suitable when used in the packaging of spoilable food products. Among the desirable properties of a polyvinylidene chloride film is that of high impermeability to oxygen and, consequently, the food product enclosed by the sealed package is adequately preserved against spoilage for the requisite time necessary in carrying out normal merchandising procedures.

As conventionally practiced, the fused portions of the films surrounding the product and constituting the seal are established by a direct heat sealing or a high frequency sealing method. The earliest and simplest form of direct heat sealing makes use of heated platens or irons which are brought into contact with the overlapped portions of the film to elevate the temperature of the same to the point necessary for fusion at the interface. In order to adequately elevate the temperature of the interface, the entire material of the portions of film in contact with the heated platens is also heated to the melting point of the film. Consequently, there is a tendency toward some extrusion and thinning of the heated material of the film and distortion accompanied by a change in crystal arrangement occurs throughout the sealed area.

In following high frequency sealing methods, alternating electric currents of high frequency are used to generate heat directly in the material of the film to be fused or sealed. As the current passes through the film it alternates or reverses direction millions of times per second causing each molecule of the film between the electrodes

2 to be twisted or distorted alternately in opposite directions. The internal friction thus created results in a substantial film temperature elevaion. While the film is being heated, additional cold metal electrodes function to carry the heat away from the film at the contacting surfaces thereof. This results in the elevating of the film temperature at the film interface while maintaining the material of the film not forming the interface thereof at a relatively cool or low temperature. Due to the action described, the material of the film is not substantially distorted or weakened along the sealed portion thereof and the effect of the heat treatment is limited to the interface in forming a fused area. Molecular rearrangement occurs only at the interface and distortion or thinning is generally not present.

In following the sealing methods described above where polyvinylidene chloride films are used in forming packages, these films, once extruded, are stretched to crystallize the same and orient the crystals thereof. Polyvinylidene chloride films exhibit ready stretchability when in an amorphous state following extrusion of the same. With substantially no crystallization having taken place, the polyvinylidene chloride film is readily stretchable and upon stretching becomes crystallized in an established and permanent crystalline orientation.

It has been considered that where use of the film is made in product packaging it is necessary to obtain oriented crystallinity to provide the requisite film strength. Upon the obtaining of crystal orientation, the film is no longer stretchable in the sense that the area of the same can be permanently increased without accompanying distortion or film weakening. Under these circumstances the film, when used in packaging various types of products wherein the conventional heat sealing methods discussed above are used, is not capable of being formed or shaped to the contour of the product so as to eliminate folds or overlapped portions along the margins thereof either in the sealed area or immediately adjacent the same. The necessity of bunching or folding certain portions of the film in lapped relation particularly along the heat sealed area creates an additional problem in obtaining an efficient seal. Special care must be taken during the sealing step in order to establish a continuous hermetic seal through the areas of bunched or overlapped film. This problem not only tends to complicate the heat sealing procedure but further adds to the difficulties of obtaining a package of neat appearance.

Upon further investigation of the ready stretchability of polyvinylidene chloride film in its amorphous state, it has been found that crystallization can be prevented or substantially retarded by supercooling the film immediately following extrusion of the same. The film in its supercooled condition can be maintained in its amorphous state and adequate time is thus provided for carrying out the stretching operation to the extent desired. Use of this unique property has been made in connection with the forming of tube or bag-like polyvinylidene chloride film products. However, where a fused sealed portion is desired in the packages formed from polyvinylidene chloride film, heat sealing methods of the type described have generally been used. In this respct, the heat sealing of the film has occurred following the stretching operation when the film has become completely crystallized and exhibits permanent crystal orientation. In this condition the stretchability property of the film has been either utilized to its fullest extent or has been overcome by maximum possible crystallization as a result of time and temperature conditions which eliminate the supercooled condition and properties attending the same.

In accordance with the principles of the present invention, it has been found that polyvinylidene chloride films when in a supercooled state can be brought together and cohered or fused to an extent that an efficient seal can be established which exhibits hermetic properties. The application of heat or the utilization of heat sealing methods of any known type, including those previously described, is unnecessary. Consequently, by hereafter referring to a fused seal it is intended to exclude the commonly accepted use of the term implying the application of heat. Upon supercooling the extruded polyvinylidene chloride film, this film not only exhibits the property of stretchability in its amorphous state, but further exhibits the property of self-coherence or self-fusibility capable of being utilized in automatically providing different forms of efficient seals. The type of seal formed will depend upon the extent to which crystallization is induced and this latter extent can be readily controlled in a manner to be described. In its supercooled or amorphous state with no substantial degree of crystallization occurring, the contacting of separate portions of polyvinylidene chloride film or films results in the immediate formation of a fused seal without distortion or thinning of the contacted portions and of a type which requires the destruction of the material of the sealed portion in order to gain access into a package formed thereby. Still further, upon the presence of a predetermined degree of inducement toward crystal formation and while the film is retained in supercooled condition and in a substantially complete amorphous state, the contacting of portions of a film or films results in the immediate formation of an efficient non-fused type of seal having a discernibly observable interface and which is readily partable, peelable or separable after subsequent maximum crystallization without attendant film destruction or distortion.

Upon investigation of the physical and chemical properties of supercooled polyvinylidene chloride film, no evidence of crystallization has been observed even though there is a variation in the type of self-sealing action occurring when portions of the film are contacted with one another. In this connection it has been found that untempered supercooled polyvinylidene chloride film forms a fused seal as described above while the film, if subsequently tempered by a short heat treatment, will form a readily peelable seal which although being readily peelable or partable, nevertheless, establishes and maintains hermetic conditions. In closely observing the film during tempering of the same within the supercooling temperature range, no discernible crystal formation has been observed. It has been theorized that during the tempering of the supercooled film, crystallization is being induced although the degree of inducement or induction present at the temperature to which the film has been tempered is not measurable or observable by the use of conventional laboratory testing methods. For purposes of description, however, and based on the theory of molecular rearrangement in preparation for crystallization, the principles of the present invention will be described herein by reference to inducement of crystallization by tempering the film in its supercooled condition. However, it should be understood that by subscribing to this theory in an effort to explain the phenomena resulting in the formation of a peelable seal, it is not intended to limit the scope of the present invention.

It is an object of the present invention to make use of the unique self-sealing properties of polyvinylidene chloride film in its supercooled condition for the packaging of products.

A further object is to provide new and improved forms of packages formed from polyvinylidene chloride films having sealed portions thereof which are of a fused nature or are readily separable or peelable without utilizing mechanical means and without attendant destruction or distortion of the film surrounding or forming the seal.

An additional object is to provide a practical method of continuously forming separately packaged products, which method makes use of sheets of supercooled polyvinylidene chloride film.

An important object of the invention is the provision of a package and method of forming the same wherein a film of supercooled polyvinylidene chloride is caused to accurately conform itself to the surface details of an irregular object to be packaged.

Another object is to provide an improved form of packaging apparatus capable of carrying out the method of the present invention, the apparatus being adapted for continuous operation and being generally of uncomplicated design, the apparatus further including package forming die elements capable of functioning to automatically provide a self-sealed package in line with the advantageous use of the supercooled properties of polyvinylidene chloride film.

A further object is to provide a method of continuously packaging a plurality of separate products, the products being received between continuous sheets of supercooled polyvinylidene chloride film, the supercooled properties of the film being relied upon in automatically sealing portions of the same about each of the individual products to provide separate and distinct packages, the film of each of the automatically formed packages being subsequently crystallized to complete the package treatment.

Still another object is to provide a method of continuously packaging a plurality of separate products, the products being received between continuous sheet portions of supercooled polyvinylidene chloride film, the supercooled properties of the film being relied upon to automatically seal portions of the same about each of the individual products to provide separate and distinct packages, the film being tempered prior to the packaging operation if desired or continuously tempered or heated during the packaging operation to encourage maximum crystallization following the packaging operation, the film of the package having its unique supercooled properties eliminated by crystallization subsequent to their advantageous use during the formation of the package, the crystallization resulting in substantially random crystal distribution.

A further object is to provide an improved method of packaging adapted to continuously and automatically form separate and distinct packaged products, the method utilizing supercooled polyvinylidene chloride film received in package forming cavities which bring the film into close proximty with the product and allow the sealing of the film about the product simultaneous with the evacuation and nitrogen sweeping of the package formed thereby to continuously provide a series of separate, completely sealed, evacuated packages.

Still another object is to provide a method of packaging which is of an automatic and continuous nature capable of efficiently providing vacuum packaged products at a relatively fast rate, the steps of the method each being uncomplicated in nature and the apparatus necessary to carry out the steps being of uncomplicated, low cost design, the method utilizing a continuous sheet or sheets of polyvinylidene chloride film, the excess portions of which are continuously reused so as to eliminate waste or scrap material, the method further advantageously utilizing the supercooled properties of the polyvinylidene chloride film to provide self-sealing of contacted portions of the film without the necessity of introducing fusion-promoting heat into the packaging operation.

Other objects not specifically set forth will become apparent from the following detailed description made in conjunction with the drawings wherein:

FIGS. 1A and 1B in combined form constitute a side elevational view, certain parts being shown diagrammatically, of one form of apparatus capable of carrying out the method of the present invention, the left hand portion of FIG. 1B being a continuation of the right hand portion of FIG. 1A as viewed;

Figure 1:
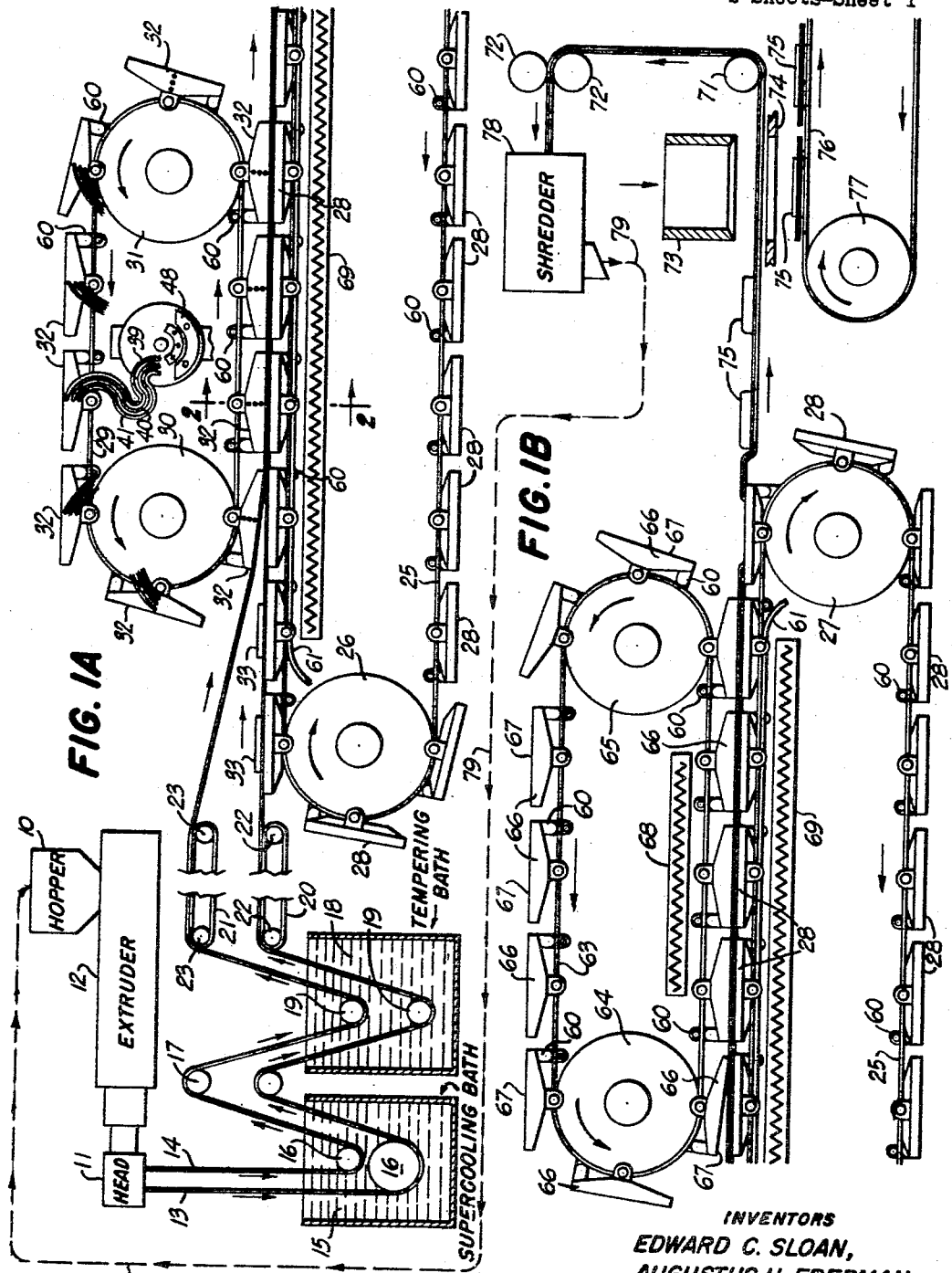

The packaging method of the present invention generally includes the extrusion of separate polyvinylidene chloride films which are immediately supercooled and, preferably, subsequently tempered so as to bring about a predetermined degree of crystallization induction. The films are passed into contact with package forming dies which are continuously operated to form a string or procession of spaced packages along the uninterrupted moving films. A product is loaded into the dies between the films prior to the automatic closing of the dies and the spaced portions of the films enclosed in each die are automatically sealed about the product. If desired, the package is swept with an inert gas and/or evacuated before complete sealing. Following formation of the packages which are still integrally connected with the continuous sheets of film, the packages are automatically and continuously passed into a crystallization portion of the apparatus wherein a degree of crystallization of the film capable of eliminating the supercooled properties of the same is obtained. Without attendant stretching of the film to a substantial degree during the packaging process as compared to the degree to which it could be stretched, crystals are ultimately formed in substantially random distribution without appreciable orientation. Random crystal distribution is not only present in the film surrounding the product but is also present in the sealed marginal portions of the package thus resulting in a package formed from film which exhibits substantially over-all uniform random distribution of crystals. Following maximum crystallization, each of the packages is automatically put from the surrounding continuous sheets of film material and the unused film material in interconnected form is suitably shredded or otherwise treated for reuse in the extruder of the packaging apparatus. The packaged products continuously cut from the sheets of film are completely sealed and are ready for label marking, storage, merchandising or the like.

As previously described in connection with the use of polyvinylidene chloride films, the supercooled properties of such films allow the same to be readily stretched and united in sealed relation with adjacent portions of similar film. Of these particular properties, the self-sealing property is essential in carrying out the method of the present invention. An efficient seal can be automatically obtained merely by bringing portions of overlying film into contact with one another and it is unnecessary to manually or otherwise promote a sealing action between these edge portions, as, for example, by the application of heat of an intensity sufficient to fuse the material. In its supercooled condition, polyvinylidene chloride film is self-cohering in and of itself and no external fusion-promoting means or conditions are necessary other than the maintaining of adequate supercooled properties.

Following the extrusion of polyvinylidene chloride film, homogeneous coherence of contacting surface portions of the resultant film will occur if contact is made before crystallization or a substantial degree of inducement of the same has occurred. Generally, fusion of contacting surfaces will occur within seven seconds after the film leaves the extrusion die under normal room temperature conditions and in the absence of supercooling. Extreme room temperature conditions will shorten or lengthen this time depending upon the temperature effect on the rate and extent of inducement to crystal formation. As crystallization induction takes place, the material loses its ability to fuse or cohere. Crystallization inducement occurs at a relatively slow rate at low temperatures and increases rapidly at high temperatures. If the film on an average thickness of about 0.002 of an inch is extruded into a water bath maintained within a temperature range of about 35° to 90° F. within two seconds after leaving the extrusion die and maintained in the water bath for a period of two seconds or more, it can be fused to itself by merely contacting surface portions thereof after delivery from the water bath.

It has been found that the amount of molecular rearrangement incipient to crystallization occurring prior to contacting surface portions of the film determines the strength of the seal established and, consequently, different forms of seals may be established upon proper control of the rate and extent of molecular rearrangement. This control can be maintained by utilizing a tempering bath through which the film is passed subsequent to the supercooling of the same. The forming of the different types of seals will also depend to an extent on the composition of polyvinylidene chloride material used.

A commonly used polyvinylidene chloride formulation is formed basically from a ratio of 85% vinylidene chloride to 15% vinyl chloride with suitable amounts of plasticizer and stabilizer. When using this particular composition in forming self-sealing packages certain preferable time and temperature conditions have been determined. If a fused seal is desired, surfaces of the film are contacted with one another directly after the film emerges from the supercooling bath or the film can be tempered in a warm water bath up to about 130° F. for 3 seconds before making the permanent, fused seal. If a peelable, partable or readily separable seal is desired, the film should be run through the tempering bath maintained at a temperature preferably within the range of about 115° to 135° F. Tempering should occur for about 22 to 28 seconds in a bath maintained at about 115° F. or for 6.5 to 9.5 seconds in a bath maintained at 135° F. A longer tempering time at lower temperatures or a shorter tempering time at higher temperatures will also produce a peelable seal, the limits and preferred conditions being readily determinable depending upon the specific composition of the film material. The foregoing conditions are based on the use of packaging equipment maintained at normal room temperatures and where the temperature of the equipment is changed, these conditions will correspondingly vary.

Another commercially available polyvinylidene chloride composition generaly utilizes a ratio of 80% vinylidene chloride to 20% vinyl chloride, the mixture having included therein adequate amounts of plasticizer and stabilizer. A film of this composition extruded into a supercooling water bath maintained within the temperature range of about 35° to 90° F. within 2 seconds after leaving the extrusion die and kept in the supercooling bath for a period of 5 seconds or more will readily fuse to itself after being brought out of the supercooling bath. The fused seal of a package can be formed immediately after the film emerges from the supercooling bath or the film material can be tempered in a water bath maintained at a temperature up to 150° F. for about 10 seconds before making the seal. Where a peelable seal is desired, the film should be run through a tempering bath following supercooling, the tempering bath being maintained at a temperature within a range of about 130° to 150° F. The film should remain in a tempering bath having a temperature of 130° F. for about 31 to 41 seconds. Where the tempering bath is maintained at a temperature of about 150° F., the film should remain for about 16 to 20.5 seconds. Here again, a longer tempering time at lower temperatures or a shorter tempering time at higher temperatures will also establish conditions under which a peelable seal can be formed.

As previously stated variations in the ratios of vinylidene chloride to vinyl chloride in forming the copolymer will affect the properties of the same and the conditions under which a fusible or peelable seal can be obtained. Preferably, the ratio of vinyl chloride used in forming the copolymer will range from about 15% to 20% and, in using compositions falling within this range, efficiently sealed packages can be readily obtained within the time and temperature conditions set forth above. Any suitable plasticizer can be used in the formation of the copolymeric film and it has been found that about 8% by weight of a mixture of ethyl phthalyl ethyl glycolate and tertiary butyl salicylate is adequate for the purposes of the present invention.

Permanent or fusion sealing of polyvinylidine chloride films in their supercooled condition utilizes the natural ability of the uncrystallized or substantially uncrystallized polymer chain to form a strong bond with adjacent polymer chains. The extrusion of polyvinylidene chloride is unique in that if the molten copolymer is rapidly quenched as it leaves the extrusion die, an amorphous supercooled product is formed and the crystallization at room temperature is greatly retarded. In the amorphous state the film is not a solid but is an extremely high viscosity liquid which is weak, pliable and easily formed at room temperature. The individual polyvinylidene chloride polymer chain exhibits the propensity to form bonds with adjacent chains. This is not confined to polymer chains within an individual sheet of film but also occurs between sheets of amorphous film which have been brought into intimate contact with each other. Upon crystallization either by long standing at room temperature or by heating, the film changes from a liquid to a solid with great increase in the hardness or toughness and strength properties. Fusion occurs between the two sheets that are in intimate contact and a seal is produced having equal or greater strength than the parent sheets of film. Without accompanied substantial stretching of the film, the crystals upon formation are randomly distributed throughout the film including the portion of the film defining the fused seal. Consequently, the material of the seal itself exhibits the same physical and chemical properties of the main body portions of the film and the entire film is homogeneous in this respect.

As previously described, with an increased degree of inducement of crystallization gained on a time and/or temperature basis, such as by retaining the film in a tempering bath for a longer period of time or passing the film through a tempering bath maintained at a higher temperature, an entirely different type of seal is obtained which is readily peelable, partable or separable without the necessity of using an implement, such as a knife or any other tool, and without destruction of the film either surrounding the product or actually forming the seal itself. With molecular rearrangement in preparation for crystallization, the film is still capable of self-coherence but the finished seal is less strong than the film itself. At a specified degree of tempering, the bond strength of the seal will be less than the strength of the parent sheets of film and the resultant seal will have the property of being separable or peelable. A seal of this nature is capable of establishing and maintaining hermetic conditions while being of sufficient strength to withstand normal handling during storage or merchandising.

Following the formation of the type of seal desired, crystallization of the polyvinylidene chloride film is carried to a maximum so as to set or stabilize the same and the package formed by use of the film is entirely capable of being handled in the same manner as any well known type of package. The packaging material further exhibits the same appearance and substantially the same properties as are well known in connection with conventional uses of polyvinylidene chloride film in the packaging of many different types of products. The integral uniting of the material of the film along contacted portions of the same during the period in which the crystallization of the film is retarded is completely adequate to provide a permanent homogeneous bond and such a seal is readily applicable for use in the packaging of perishable products. This is also true of the peelable type of seal, the only difference being that the contacted portions forming the seal retain their complete identity and may be readily separated by the subsequent user of the product without damaging the material of the seal.

In FIGS. 1A and 1B a suitable form of apparatus capable of carrying out the method of packaging of the present invention is illustrated. The apparatus is set up for quantity production of packaged products and is capable of operating continuously and in an automatic manner to provide complete formation of packaged products. In FIG. 1A a hopper 10 is continuously supplied with a polyvinylidene chloride film forming material which is extruded in a downwardly direction from an extrusion head 11 having two slot-shaped orifices and forming a part of a known type of extruder 12. The preparation of a polymer or copolymer of vinylidene chloride and the extrusion of the same is well known and conventionally practiced in the forming of film for use in the packaging of products as well as other purposes.

Spaced continuous sheets 13 and 14 of the polyvinylidene chloride film are drawn downwardly from the extruding head 11 and passed into a supercooling bath 15 around spaced rollers 16. Hot stretching occurs at the extruding head 11 to a slight degree to attain the desired thickness of film. However, while some molecular rearrangement may occur as a result of the stretching, the degree is insufficient to effect the subsequent variable uses of the film. The supercooling bath 15 contains water maintained at a suitable temperature such as within the range of 35° to 90° F. The sheets 13 and 14 are passed immediately into the supercooling bath 15 and the resulting reduction in temperature retards crystallization of the films. The sheets 13 and 14 are passed upwardly out of the supercooling bath 15 over spaced rollers 17 and downwardly into a tempering bath 18 around rollers 19 located therein. The tempering bath 18 is not essential to form a fused seal but is preferably used in the forming of a peelable seal. This bath when used is preferably a water bath maintained at a temperature within the ranges previously described.

The supercooling bath 15 functions to suddenly and substantially lower the temperature of the films while the tempering bath 18 functions to raise the temperature of the same so as to promote molecular rearrangement in preparation for crystallization of the film while allowing retention of the stretchable and homogeneous self-bonding properties of the film to a degree desired in order to carry out the remaining steps of the packaging method. The controlled tempering of the films by use of the bath 18 can not only establish the type of seal ultimately obtained but can further aid in reducing the time and degree of heating necessary following the packaging operation to obtain maximum crystallization in order to provide fully finished packages. In other words, it is desirable to provide continuous, controlled inducement of crystallization as the films pass through the packaging apparatus to ultimately produce a completely finished, packaged product in the shortest length of time while utilizing the least amount of equipment. While use of the tempering bath 18 is preferred it is not essential as complete crystallization of the film may be accomplished following completion of the sealing operation.

The supercooled sheets 13 and 14 are passed out of the tempering bath 18 over endless belts 20 and 21 operated by rollers 22—22 and 23—23. The belts 20 and 21 may be of any desired length for the purpose of conveying the sheets 13 and 14 to the package forming apparatus in supported condition. The uppermost sheet 14 is advanced directly overhead the lower sheet 13 in spaced relation therewith. The sheets 13 and 14 in this relation are separately conveyed to a packaging machine which includes a lower, continuously moving die belt 25 passing around horizontally spaced rollers or drive means 26 and 27 operating in the direction indicated by the arrows. The continuous die belt 25 moves in a clockwise direction and carries a series of spaced die members 28 which receive the lower sheet 13 as will subsequently be described. The packaging machine further includes an upper continuous die belt 29 which moves about horizontally spaced rollers or drive means 30 and 31 in a counterclockwise direction and has attached thereto a series of spaced upper die members 32. The upper die members 32 are adapted to be moved into closing relation with the lower die members 28 in such a manner as to receive therebetween the upper and lower sheets 14 and 13 as well as a product.

The lowermost sheet 13 is received against the top surface of each of the lower die members 28 as they move into the top horizontal plane of the package forming apparatus at the left hand end thereof as viewed in FIG. 1A. Following the contact of the lower sheet with each successive lower die member 28, a product 33 is deposited on the top surface of the sheet 13 immediately over the top of each lower die member 28. The products 33 may be machine fed at timed intervals by any suitable form of feeding apparatus or may be manually deposited at proper intervals by an operator.

The lower die members 28 are provided with cavities therein which receive a product 33 and upon the placing of the product onto the top surface of the lower sheet 13, that portion of the sheet 13 associated with the product and lower die member is stretched downwardly either by the weight of the product or by some suitable means and the product is lowered into the die cavity. Consequently, following the product loading station of the packaging machine, each lower die member 28 has received in its cavity a product 33 having the bottom surface thereof covered by the associated portion of the continuous lower sheet 13. The stretching of the lower sheet 13 to allow movement of the product down into the die cavity of the lower die member 28 is permitted by reason of the continued presence of the super-cooled properties of the polyvinylidene chloride film.

Following the loading of the lower die member 28 with the product, the upper sheet 14 moves into contact with an upper die member 32 which also at the same time moves into covering relation with an associated lower die member 28. The speed of travel of the sheets 13 and 14 and mating die members 28 and 32 are synchronized to provide automatic mating at the proper time. As a result, a complete package forming and evacuation die constituting a lower die member 28 and an upper die member 32 is provided, the lower die member 28 carrying the product and having associated therewith a portion of the lower sheet 13 and the upper die member 32 having associated therewith a portion of the upper sheet 14 for ultimate automatic formation of a completely packaged product within the associated pairs of die members.

Figure 2:
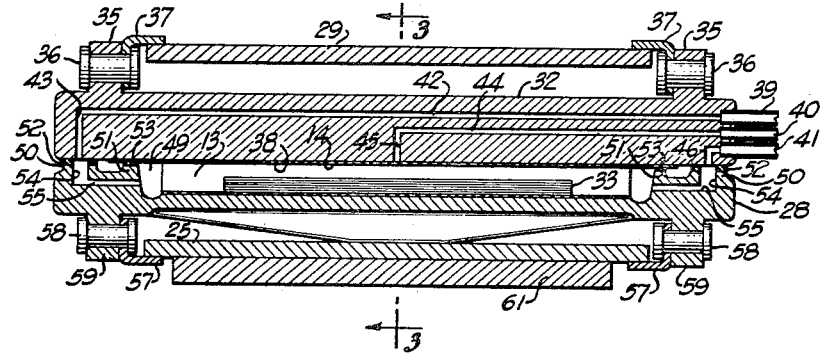
FIG. 2 is an enlarged vertical section taken generally along line 2—2 of FIG. 1A showing the details of one pair of the mating evacuation and package forming dies of the apparatus of the present invention.

In FIG. 2 the important structural features of a die in closed relation are shown. The closed die consists of an upper die member 32 and a lower die member 28 as previously described. The upper die member 32 has its top surface provided with laterally spaced, upwardly directed, drilled ears 35 each having received therethrough a double headed pin or rivet 36 which pivotally attaches the upper die member 32 to the upper continuous die belt 29, the latter being provided with outwardly directed, drilled attaching ears 37 each of which receives a rivet 36 therethrough. The upper die member 32 is provided with a flat bottom surface 38 and one of the side surfaces is provided with a series of horizontally extending bores having fixedly received in enlarged ends thereof the ends of flexible hoses 39, 40 and 41. The end of the flexible hose 39 attached to the upper die member 32 is in communication with a drilled passageway 42 extending transversely through the interior of the upper die member 32 in a horizontal direction and being in communication at its opposite end with a vertically downwardly directed, drilled passageway 43 which opens outwardly through the bottom surface 38 of the member 32. The end of the flexible hose 40 associated with the upper die member 32 is in communication with a transversely extending, drilled passageway 44 which extends substantially to the center of the die member 32 and is in communication with a vertically downwardly directed drilled passageway 45 opening through the bottom surface 38 of the die member 32. The end of the flexible hose 41 associated with drilled passageway 46 which opens downwardly through the bottom surface 38 of the member 32 just inwardly of the side margin of the member 32 to which the ends of the flexible hoses are attached.

The flexible hoses 39, 40 and 41 as shown in FIG. 1A extend toward the center area of the upper continuous die belt 29 and their outer ends are in communication with a rotating valve 48 which may be of any suitable design for automatically controlling the sequence of steps during the evacuation operation while rotating in synchronized relation with the plurality of upper die members 32 carried by the belt 29. Any suitable type of automatic evacuation valve may be used as long as the valve is capable of carrying out the sequence of operational steps to be described during the evacuation portion of the cycle of operation of the die members.

Each of the bottom die members 28 is constructed as shown in FIG. 2. These members include a centrally depressed portion 49 which defines the die cavity in which the product 33 is received and the package is formed. Centrally on each of the sides of the die cavity 49 is a raised annular boss 50 which is provided with a flat top surface to which is bonded an annular gasket 52 which sealingly engages the bottom surface 38 of the upper die member 32 when the die members are paired and closed. An inner rib 51, which is circumferentially continuous and formed integral with the bottom die member 28, seals off the ends of the paired die members as well as the sides by reason of its carrying a gasket 53 along the top surface thereof. Each boss 50 and associated gasket 52 on the sides of the lower die member 28 surrounds a vertically directed, drilled passageway 54 which is at its lowermost end in communication with a horizontally extending, drilled passageway 55 which, in turn, is in communication with the cavity 49. The passageways 54 communicate with the passageways 43 and 46 of the upper die member 32 and are sealed from the atmosphere by contact between the gaskets 52 and the surface 38 of the upper die member 32.

The bottom surface of the lower die member 28 is provided with laterally spaced flanges 57 which have double headed pins or rivets 58 extending therethrough rotatably attaching the lower die member 28 to drilled ears 59 carried by the lower continuous die belt 25. Referring to FIG. 1A, each of the upper and lower die members 32 and 28 are provided with belt clamping and following means 60 near one of the ends thereof. The clamping and following means 60 maintain each of the dies in susbtantially parallel relation with its associated belt during the continuous movement of the same. The lower die belt 25 has a guide rail 61 associated with the top portion thereof which supports the lower die members 28 and belt 25 in a horizontal position when they move into product receiving and package forming relation with the remaining elements of the packaging apparatus.

Figure 3:
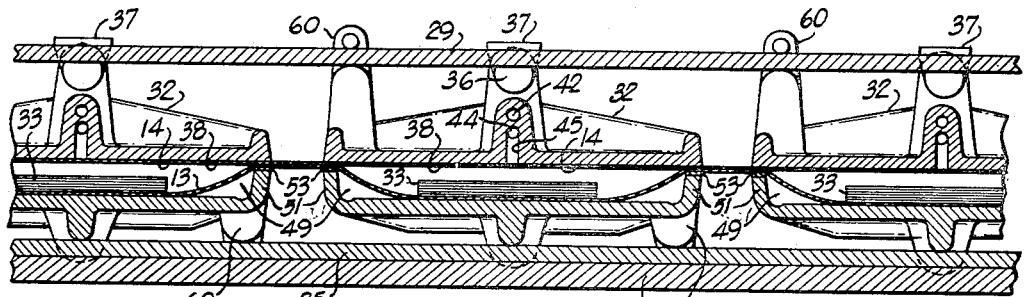
FIG. 3 is a fragmentary sectional view of a plurality of adjacent package forming dies of the apparatus of the present invention each of the dies being sectioned as generally indicated by line 3—3 of FIG. 2.

Referring to FIGS. 1A and 3, the lower sheet 13 is introduced into contact with the top of the continuously moving bottom die members 28 as previously described and the upper sheet 14 is introduced into contact with the bottom surface 38 of the continuously moving upper die members 32 and ultimately brought into close association with the bottom sheet as the upper and lower die members are brought into closed relation. Prior to the bringing of the upper die members 32 into closed association with the lower die members 28, a product 33 is delivered onto the top surface of the bottom sheet 13 in alignment with the cavity 49 in each of the bottom die members 28 as previously described. The weight of the product 33 alone or the use of other means stretches the lower sheet portion downwardly into contact with the bottom surface of the die cavity 49 into the position shown in FIG. 3. The width of the bottom sheet 13 is such that its side margins are readily received within each of the cavities 49 and spaced from the side walls thereof as shown in FIG. 2 so as not to interfere with the inwardly opening passageways 55 on either side thereof.

The sealing gasket 53 being circumferentially continuous and carried by the rib 51 seals the opposed surfaces of the lower and upper sheets 13 and 14 at their points of entrance and exit relative to the closed die members 28 and 32 as shown in FIG. 3. These spaced portions of the sheets 13 and 14 are clamped together by the bringing of the upper die member 32 into closed relation with an associated lower die member 28. A circumferentially continuous seal between the upper and lower die members is formed by the sealing gasket 53 due to the weight of the upper die member 32 resting on the lower die member 28. The portions of the sheets 13 and 14 intermediate the closed dies and in contact with the gasket 53 are homogeneously united together by reason of the supercooled properties of the polyvinylidene chloride.

The portion of the upper sheet 14 received within each of the dies is retained out of contact with the product 33 and that portion of the lower sheet 13 which has been stretched downwardly by the product 33 into its position below the same. Consequently, upon initial closing of each die, the portions of the sheets 13 and 14 received therein are prevented from cohering with one another until such time as sealing action is desired. The upper sheet 14, as shown in FIG. 2, is of greater width than the lower sheet 13 and its side margins are clamped to the bottom surface 38 of the upper die member 32 by the gasket 53 carried by the rib 51. Consequently, the inclosed dies, having a product and portions of uncontacted supercooled film in each of the die cavities and further being completely sealed from the atmosphere, are now ready for the initiation of the evacuation and automatic packaging cycle which is controlled by the rotating valve 48.

As the closed dies continue movement in the direction of the arrows in FIG. 1A, the ends of the flexible hoses 39, 40 and 41 associated with the rotating valve 48 come into contact with various spaced ports in the valve 48 to evacuate the area surrounding the product 33 and subsequently automatically contact portions of the film material received within the die cavity 49. The first stage of the evacuation step of the method includes the drawing of a vacuum through the flexible hoses 39 and 40 and their respective interconnected drilled passageways while maintaining the flexible hose 41 closed to the atmosphere. The vacuum drawn through the hose 39 and passageways 42 and 43 exhaust the die cavity 49 through the pasageways 54 and 55 in communication with the passageway 43. The vacuum drawn through the hose 40 and passageways 44 and 45 acts on the upper surface of that portion of the upper sheet 14 neceived within the die cavity 49 to retain the same in contact with the bottom surface 38 of the upper die member 32. As a result, the drawing of a vacuum on the die cavity 49 will not pull that portion of the upper sheet 14 received therein in a downwardly direction by reason of the balancing action established by the vacuum drawn through the hose 40. The materials received within the die cavity 49 still retain their relative positions as illustrated in FIG. 2.

Following the drawing of the vacuum through the hoses 39 and 40 and upon further rotation of the valve 48, the end of the hose 41 associated with the rotating valve 48 becomes aligned with an inert gas supply port which introduces an inert gas, such as nitrogen, into the hose 41, through the L-shaped passageway 46 and through the passageways 54 and 55 associated therewith into the interior of the die cavity 49. The die cavity 49 is thus swept or washed with nitrogen, this gas being drawn off through the passageways associated with the hose 39 through which a vacuum is still being drawn. Likewise, a vacuum is still being drawn through the flexible hose 40 to retain the upper sheet 14 in contact with the bottom surface 38 of the upper die member 32.

Following the sweeping of the die cavity 49 with an inert gas and upon continued movement of the combined dies and continued rotation of the valve 48, the flexible hose 41 is closed off and a vacuum is continued to be drawn through the hoses 39 and 40 thereby removing the nitrogen from the die cavity 49. The die cavity 49 has now been vacuumized and swept by an inert gas and the cycle of operation is such that the package is now to be automatically formed.

Figure 4:
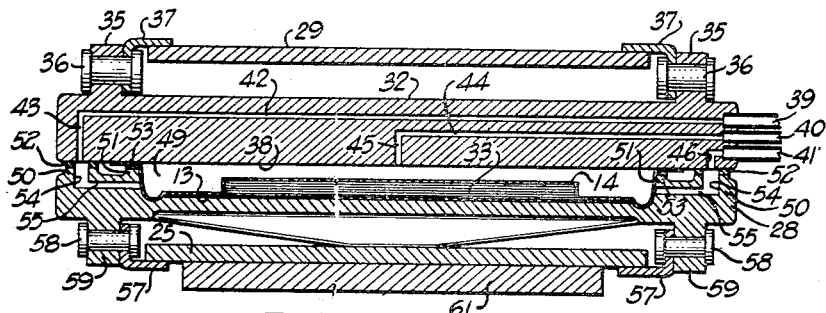
FIG. 4 is a view similar to FIG. 2 illustrating the package completing step of the method of the present invention.

The impressing of a vacuum on the hose 39 is continued while the hose 41 is completely closed off and the hose 40 is now opened to the atmosphere upon further rotation of the valve 48. The vacuum drawn by the hose 39 on the interior of the cavity 49 and the release of the vacuum drawn by the hose 40 on the upper sheet 14 now causes that portion of the upper sheet positioned above the product 33 to be drawn downwardly over the product 33 and to have its marginal portions contacted with the marginal portions of the lower sheet 13. The results of this step are shown in FIG. 4 where it will be noted that the central portion of the upper sheet 14 is stretched downwardly over the top of the product 33 and the side margins of the same are brought into intimate contact with the exposed side margins of the bottom sheet 13.

As each of the sheets 13 and 14 are still in their supercooled condition, the stretching of the upper sheet is readily attained and the side margins of the same are retained in clamped relation between the gasket 53 and the bottom surface 38 of the upper die member 32. Instantaneous sealing between the contacted side margins of the upper and lower sheets 14 and 13 occurs as a result of the supercooled cohering properties of the polyvinylidene chloride films. Sealing occurs on each side and end of the product 33 so as to completely enclose the same and the interior of the completed package is vacuumized due to the manner in which the package is formed. At this stage of the operation the sheets 13 and 14 are completely cohered together or integrally united at all points except at spaced intervals where the separate products 33 are interposed therebetween. Consequently, a continuous series of interconnected and completed packages are formed and the formation of these packages occurs automatically without the necessity of manual manipulation of either the elements making up the package or those forming the apparatus.

By completely forming each package while the film is in its supercooled condition an improved form of package results. When the upper sheet 14 is drawn downwardly in intimate covering relation with the top and side surfaces of the product, the portion of the sheet contacting the product is stretched to a sufficient degree resulting in comformance of the sheet portion to the shape of the product without folding or bunching portions thereof. In other words, that portion of the upper sheet contacting the product takes the detailed contour and shape of the product because of its ability to stretch in the supercooled condition. Consequently, the film of both the upper and lower sheets forming the package is completely smooth and uniform for all practical purposes throughout its entire areas. There are no bunched or folded portions either in association with the product or in the sealed area around the product. The film material of the seal is smooth and uniform throughout the entire area of the seal and the contacting film portions thereof are in coplanar relation throughout the entirety of the seal.

The use of the supercooled properties of polyvinylidene chloride film in the manner described results in the formation of a smooth package of very neat appearance. The product carried within the package, as well as any inserts or backing material which carry printed information thereon, can be readily viewed through the transparent packaging film from any position. Where bunching or folding of portions of film are necessary in order to obtain a tight and properly sealed package in line with conventional practices, it is necessary to locate the folds or bunches in a predetermined manner so as not to interfere with product or indicia observation. Still further, in utilizing the method of the present invention a package of unique appearance can be obtained as the top film portion will assume the contour of the product therein while completely protecting the same. This has been considered desirable in the instance where bacon packages are formed by the use of polyvinylidene chloride film in conformance with the principles of the present invention, the top sheet of the packaging film taking the contour of the exposed top surfaces of the stacked or overlapped strips of bacon.

As previously stated, a certain degree of hot stretching occurs while the film is being drawn from the extruder. Additional stretching occurs when the product is lowered into the bottom die member and stretches the contacted portion of the bottom sheet of supercooled film. Further stretching occurs as described above when the opposed portion of the top sheet is drawn down over the product in intimate contact therewith. The extent of stretching in any of these instances is not adequte to cause any noticeable or measurable crystal formation or, of course, crystal orientation. Consequently, the cumulative degree of stretching occurring during the carrying out of the method of the present invention is not adequate to defeat the purposes thereof and upon subsequent maximum crystallization of the package film there is no appreciable crystal orientation. The degree of film thinning or distortion resulting from the aforementioned stretching is of no consequence and does not noticeably weaken the film strength nor affect efficient use of the same in package formation. What little thinning or distortion occurring is not at all comparable to that which occurs when conventional heat sealing methods are used in package formation.

Referring again to FIG. 1A, upon completion of the packaging of the product, the upper die members 32 are moved out of contact with the lower die members 28 and are returned by the belt 29 to recommence the cycle of packaging operation. The lower die members 28 containing the completed package within their die cavities 49 continue to travel in a horizontal path toward the crystallization portion of the packaging apparatus shown in FIG. 1B. A continuous die belt 63, being moved in a counterclockwise direction about spaced rollers 64 and 65, which are driven by suitable means, carries a plurality of spaced die closure members 66 which are similar in design as the upper die members 32 previously described with the exception that the closure members 66 are not provided with internal passageways connected with flexible hoses for evacuation purposes. The closure members 66 primarily afford a flat bottom surface 67 similar to the surface 38 of the upper die members 32 which is used to close the cavity 49 of each of the lower die members as they pass into contact with the closure members 66. The closure members 66 are heated by any suitable means, such as a radiant heater 68, to raise the temperature of the polyvinylidene chloride film forming the packages and thus promote crystallization of the same so as to minimize the stretchability and self-cohering properties of the film. The closure members 66 travel continuously in the direction indicated by the arrows and are received over the top portion of each of the lower die members 28 while the latter are moved toward the roller 27.

As previously described, in order to reduce the time necessary to complete the packaging operation and/or obtain a controllably peelable seal, temperature raising means, such as the tempering bath 18, are preferably used to provide controlled molecular rearrangement while at the same time retain the requisite stretchability and homogeneous uniting properties of the polyvinylidene chloride film. In order to further facilitate the completion of the packaging operation, a continuous radiant heater 69 may be provided below the lower die members 28 intermediate the rollers 26 and 27. Consequently, the temperature of the lower die members 28 is being slowly and constantly raised during the evacuation and packaging operations. The heater 68 raises the temperature of the closure members 66 and upon the introduction of the lower die members 28 into the crystallization stage of the apparatus, the temperature of the polyvinylidene chloride film is such that adequate crystallization occurs in a short length of time.

Following adequate crystallization of the film, the continuous sheets having the spaced packages formed integral therewith are passed to a cut-out station and the lower die members 28 are returned to the first portion of the packaging machine shown in FIG. 1A to recommence the cycle of operation. A roller 71 and paired rollers 72 continuously draw the bonded sheets past cut-out apparatus, such as the type schematically illustrated by the cutting die 73. The cutting apparatus may be of any suitable form utilizing a reciprocating cutting die 73 which is passed through a platen 74 for cutting out the spaced packages from the continuous sheets of film. The cut-out packages, are dropped onto an endless belt 76, a portion of which is shown, which is operated by suitable rollers, such as the roller 77. The belt 76 then continuously moves the newly cut packaged product 75 from below the platen 74 and the unused portions of the sheets 13 and 14, which are still of a continuous nature, are drawn by the rollers 71 and 72 into a shredder 78. The shredder conditions the unused portions of the sheets and returns the same as indicated by the broken line 79 to the hopper 10 to allow this material to be reused in the continuous packaging operation.

The finished and separated packages are now in condition for handling for purposes of applying labels or other identifying marks as well as for storing or packaging. The desirable properties of stretchability and homogeneous cohering resulting from retarding crystallization of the film are utilized by the method of the present invention to enable the packages to be automatically formed, thus providing an economical and uncomplicated method of packaging. These properties are eliminated from the film during the continuous packaging operation and the resultant packaged product may be handled in any desired manner in line with conventional practices. Any suitable type of packaging apparatus capable of carrying out the packaging steps described above may be utilized and the particular apparatus illustrated and described is merely one form of low cost apparatus suitable for use in conjunction with the principles of the present invention.

The following examples are illustrative of time and temperature conditions used in carrying out the method of the present invention in forming packages provided with a fused or permanent seal. The operating conditions set forth are particularly designed for use with the apparatus previously described, and as these conditions are merely illustrative, it is not intended hereby to limit the scope of the present invention as set forth in the appended claims.

*Example 1*

Two separate sheets of polyvinylidene chloride film formed from a ratio of approximately 85% vinylidene chloride to 15% vinyl chloride were continuously extruded at a thickness of about 0.002 of an inch from a die forming a part of apparatus of the type previously described. The continuous sheets were introduced into a water bath maintained at a temperature of approximately 55° F. to supercool the same. Any single portion of the continuous sheets was received within the supercooling bath within 1 second of its extrusion and kept submerged therein for 4 seconds. Following the supercooling bath, the sheets were run through a tempering water bath maintained at a temperature of approximately 115° F. and held therein for 8 seconds from which they were introduced into the package forming portion of the apparatus. The packages were formed and the marginal portions of the same sealed within 10 seconds after leaving the tempering bath. The seal formed in each package was a permanent fused seal and the film material forming the seal was not distorted or different in appearance or property in any manner from the remaining material of the film.

*Example II*

Separate sheets of the same composition and thickness as set forth in Example I were extruded and introduced into a supercooling water bath maintained at a temperature of 40° F. The film was subjected to supercooling within 2 seconds following its extrusion and was submerged in the supercooling bath for 4 seconds. The film was then held in a tempering water bath for 3 seconds at a temperature of 125° F. The packages and individual fused seals were formed within 10 seconds after leaving the tempering bath.

*Example III*

Separate sheets of extruded film of the same composition and thickness of Example I were introduced into a 60° F. water bath within 1 second after extrusion and maintained therein for 4 seconds. A permanent fused seal was made with each separate package within 10 seconds after leaving the supercooling bath.

*Example IV*

Two separate sheets of polyvinylidene chloride film formed from a ratio of approximately 80% vinylidene chloride to 20% vinyl chloride were continuously extruded at a thickness of about 0.002 of an inch from a die forming a part of apparatus of the type previously described. The continuous sheets were introduced into a water bath maintained at a temperature of approximately 55° F. within 2 seconds after leaving the die. The sheets were submerged in the supercooling bath for 4 seconds. Following the supercooling bath, the sheets were run through a tempering bath maintained at a temperature of approximately 130° F. and held therein for 16 seconds. A fused seal on each separate package was made within 10 seconds after leaving the tempering bath.

*Example V*

Separate sheets of the same composition and thickness as set forth in Example IV were extruded and introduced into a supercooling water bath maintained at a temperature of 40° F. The film was subjected to supercooling within 1 second following its extrusion and was submerged in the supercooling bath for 4 seconds. The film was then held in a tempering water bath for 10 seconds at a temperature of 140° F. The packages and individual fused seals were formed within 10 seconds after leaving the tempering bath.

*Example VI*

Separate sheets of extruded film of the same composition and thickness of Example IV were introduced into a 60° F. water bath within 2 seconds after extrusion and maintained therein for 4 seconds. The film was run through a tempering bath maintained at a temperature of 150° and held therein for 6 seconds. A permanent, fused seal was made with each separate package within 10 seconds after leaving the tempering bath.

The following additional examples are illustrative of conditions yielding a readily separable or peelable seal.

*Example VII*

Polyvinylidene chloride films formed from a ratio of approximately 85% vinylidene chloride to 15% vinyl chloride were extruded in the same manner as described above and introduced into a 55° F. supercooling water bath within 1 second following extrusion. The films were submerged in the water bath for 4 seconds. The films were then introduced into a tempering water bath maintained at a temperature of 115° F. and held therein for 25 seconds. Individual sealed packages were formed within 10 seconds after leaving the tempering bath. The seals formed were readily separable following an extended period of storage. During storage it was noted that the seal, although readily separable without the aid of tools or implements, was highly efficient and established and maintained hermetic conditions.

*Example VIII*

Film of the same composition as Example VII was extruded in separate sheet form and introduced into a 40° F. supercooling water bath within 2 seconds following the extrusion thereof. The film was submerged in the water bath for 4 seconds. The film was then introduced into a tempering bath maintained at a temperature of 125° F. and submerged therein for 16 seconds. Sealed packages were formed within 10 seconds after leaving the tempering bath. Upon subsequent storage the seals were found to be readily separable and peelable and during the storage period maintained hermetic conditions.

*Example IX*

Film of the same composition as set forth in Example VII was extruded in separate sheet form into a 60° F. water bath within 1 second. The film was supercooled for 4 seconds. The film was then tempered in a water bath maintained at 135° F. for 8 seconds and sealed packages were formed within 10 seconds after leaving the tempering bath. A readily peelable seal was formed.

*Example X*

Polyvinylidene chloride films formed from a ratio of approximately 80% vinylidene chloride to 20% vinyl chloride were extruded in the same manner as described above and introduced into a 55° F. supercooling water bath within 1 second following extrusion. The films were submerged in the water bath for 4 seconds. The films were then introduced into a tempering bath maintained at a temperature of 130° F. and held therein for 35 seconds. Individual, sealed packages were formed within 10 seconds after leaving the tempering bath. The seals formed were readily separable following an extended period of storage.

*Example XI*

Film of the same composition as Example X was extruded in separate sheet form and introduced into a 40° F. supercooling bath within 2 seconds following the extrusion thereof. The film was submerged in the water bath for 4 seconds. The film was then introduced into a tempering bath maintained at a temperature of 140° F. and submerged therein for 25 seconds. Sealed packages were formed within 10 seconds after leaving the tempering bath.

*Example XII*

Film of the same composition as set forth in Example X was extruded in separate sheet form into a 60° F. water bath within 2 seconds. The film was supercooled for 4 seconds. The film was then tempered in a water bath maintained at 150° F. for 18 seconds and sealed packages were formed within 10 seconds after leaving the tempering bath.

As previously described, without extensive or even appreciable stretching of the supercooled film, crystal formation subsequently occurs at random and no set pattern of orientation results. The sealed portions are not materially distorted or thinned and the strength of the material forming the seals is the same as that of the body portions of the package. In connection with the fused seal, the interface is completely indiscernible upon microscopic examination whereas the interface of the peelable seal is readily defined by a continuous discernible line. The bond created between the material forming the peelable seal is adequate to establish hermetic conditions and maintain the same over extended periods of time. However, the seal may be readily broken by peeling one film away from the other without the necessity of using a sharp implement or other tool. This is of particular advantage to the package user as a corner portion of a seal may be provided with a piece of tab-like, insert material which maintains separation between the plies of the seal to allow the user to grip edge portions of each ply and peel one away from the other. During peeling the film is not torn or damaged to any extent inasmuch as the film itself is of greater strength than the seal. Without accompanying damage to the film, the package is thereby retained intact and, where desired, the top and bottom sheets may be used to recover the contents of the package, this feature being particular importance in the use of packaged food products. Both types of seal, permanent and peelable, are capable of withstanding usual cooking temperatures in the event that the product enclosed therein is heat processed following the packaging operation. Still further, freezing or low temperatures have no effect on the efficiency of the seals formed thereby.

The packaging method and the particular form of apparatus described above is readily adapted for use in the packaging of many different types of products. In this connection, inorganic products as well as organic products, such as spoilable foods, may be inserted between the continuous sheets and packaged thereby in accordance with the principles of the present invention. In the packaging of food products, cheese, bacon and table ready meats, such as bologna, are examples of the types of products particularly adapted for packaging in conformance with the method described. Cardboard stiffness in the form of flat or partially folded panels may readily be inserted between the spaced sheets during the product loading portion of the packaging procedure and, of course, such stiffeners or any other types of paper or other materials positioned between the sheets in association with the product may carry suitable indicia for product identification purposes.

While the method of the present invention has been described in connection with the use of two completely separate sheets of polyvinylidene chloride film, it should be understood that any number of such sheets as well as additional sheets of different types of film may be used if desired. By way of example, a single sheet of polyvinylidene chloride film may be supercooled and appropriately folded upon itself longitudinally to provide upper and lower sheet portions between which the product is placed and the marginal edges of the overlapping portions sealed in the same manner as described while following the principles of the method disclosed. Still further, spaced portions of a single continuous sheet may be overlapped in a lateral or transverse direction in such a manner as to provide a plurality of transverse fold lines and the produce interposed between the overlapped portions of the sheet thereby providing a double thickness of film in association with either the bottom surface or the top surface of the product. The thickness of each sheet may be varied considerably by adjusting the extruder die slot.

In line with various modified uses of the method, supercooling or maximum crystallization of certain areas of a continuous sheet or sheets of polyvinylidene chloride film may be followed without fully supercooling or crystallizing the entire continuous sheet or sheets. In this connection, by way of example, the location of each of the spaced packages being predetermined, certain areas of the film which are intended to form the sealed margins of the packages may be retained in supercooled condition while the remainder of the film may be crystallized. The area of the film contacting the product may be quickly stabilized following supercooling of the entire film and the sealing areas allowed to retain the unique properties of supercooled polyvinylidene chloride film for subsequent homogeneous uniting. Maximum crystallization of product contacting portions may be desirable in the event of adverse product reaction or for the purpose of providing a self-sustaining shape to the film. Still further, packages may be formed in subdivisions, each of which contains a separate product. In this connection it should be particularly noted that the peelable type of seal is especially advantageous.

A plurality of spaced sheets of varying thickness may also be used in the event that a double thickness of film is desired in association with the top or bottom surfaces of the product. The varying thicknesses may be desirable in controlling the oxygen transmission properties and low temperature strength of the film under special circumstances. For example, two different types of polyvinylidene chloride film may be used in forming a package where it is desired that oxygen transmission be as low as possible and the low temperature strength be as high as possible. One of the films may exhibit low temperature strength and flexibility while being oxygen permeable to an undesirable degree. The other film may exhibit the requisite oxygen impermeability while having an inadequate low temperature strength. Two films of this nature may be applied in forming the package in overlapped relation and the desirable properties of one film will compensate for the undesirable properties of the other film so as to form a package capable of exhibiting the desired over-all properties.

Obviously many modifications and variations of the invention as hereinbefore set forth may be made without departing from the spirit and scope thereof, and therefore only such limitations should be imposed as are indicated in the appended claims.

We claim:

1. A method of packaging including extruding spaced sheets of polyvinylidene chloride film, immediately supercooling said sheets to retard crystallization of said film, inserting a product between said sheets, contacting portions of said sheets to completely enclose said product, and completing maximum obtainable crystallization of said film.

2. A method of packaging including extruding spaced sheets of polyvinylidene chloride film, immediately supercooling said sheets to retard crystallization of said film, raising the temperature of said sheets to provide controlled crystallization induction in said film, inserting a product between said sheets, contacting portions of said sheets to enclose said product while said sheets are still in a supercooled state, and completing maximum obtainable crystallization of said film.

3. A method of packaging including extruding spaced sheets of polyvinylidene chloride film, immediately supercooling said sheets to retard crystallization of said film, inserting a product between said sheets, evacuating the area surrounding said product and between said sheets, flushing said evacuated area with an inert gas, contacting portions of said sheets to enclose said product while said sheets are still in a supercooled state, and completing maximum obtainable crystallization of said film.

4. A method of packaging including extruding spaced sheets of polyvinylidene chloride film, immediately supercooling said sheets to retard crystallization of said film, raising the temperature of said sheets to provide controlled crystallization induction in said films, inserting a product between said sheets, evacuating the area surrounding said product and between said sheets, flushing said evacuated area with nitrogen, contacting portions of said sheets to enclose said product while said sheets are still in a supercooled state, and completing maximum obtainable crystallization of said film.

5. The method of forming a package which comprises: extruding continuous sheets of polyvinylidene chloride film, immediately supercooling said sheets to retard crystallization of said film, conveying said sheets in spaced relation through a product loading zone, the lowermost sheet having portions thereof associated with spaced dies provided with product receiving cavities, said dies being continuously passed through said zone and each receiving a product therein placed on the top surface of said lowermost sheet and stretching the same downwardly to fill the cavity while retaining marginal portions for sealing with the uppermost sheet, moving said uppermost sheet into non-contacting covering relation with the spaced products, covering said die cavities with separate overhead dies to completely enclose said product and the portions of said sheets associated therewith, evacuating each of the paired dies intermediate said sheet portions to draw the portion of the uppermost sheet enclosed thereby into sealing engagement with the marginal areas of the portion of the lowermost sheet associated therewith, separating the packaged products and dies, furthering crystallization of said film, and separating the packaged products from the excess material of said sheets.

6. The method of forming a package which comprises: extruding continuous sheets of polyvinylidene chloride film, immediately supercooling said sheets to retard crystallization of said film, conveying said sheets in vertically spaced relation through a product loading zone, the lowermost sheet having portions thereof associated with spaced dies provided with product receiving cavities, said dies being continuously passed through said zone and each receiving a product therein placed on the top surface of said lowermost sheet and stretching the same downwardly to fill the cavity while retaining marginal portions for sealing with the uppermost sheet, moving said uppermost sheet into non-contacting covering relation with the spaced products, covering said die cavities with separate overhead dies to completely enclose said product and the portions of said sheets associated therewith, drawing a vacuum within each of the paired dies to evacuate the area surrounding the product while maintaining separation between the enclosed portions of said sheets, washing the product in each of the paired dies with nitrogen, evacuating each of the paired dies intermediate said sheet portions to draw the portion of the uppermost sheet enclosed thereby into sealing engagement with the marginal areas of the portion of the lowermost sheet associated therewith, separating the packaged products and dies, furthering crystallization of said film, and separating the packaged products from the excess material of said sheets.

7. The method of forming a package which comprises: extruding continuous sheets of polyvinylidene chloride film, immediately supercooling said sheets to retard crystallization of said film, passing said sheets through a tempering water bath to induce crystallization of said film to an extent that the supercooled properties are retained while further short time heating will substantially crystallize said film, conveying said sheets in vertically spaced relation to a product loading zone, the lowermost sheet having portions thereof associated with spaced dies provided with product receiving cavities, said dies being continuously passed through said zone and each receiving a product therein placed on the top surface of said lowermost sheet and stretching the same downwardly to fill the cavity while retaining marginal portions for sealing with the uppermost sheet, moving said uppermost sheet into non-contacting covering relation with the spaced products by covering said dies with separate overhead dies to completely enclose said product and the portions of said sheet associated therewith, drawing a vacuum within each of the paired dies to evacuate the area surrounding the product while maintaining separation between the enclosed portions of said sheets, washing the product in each of the paired dies with nitrogen, evacuating each of the paired dies intermediate said sheet portions to draw the portion of the uppermost sheet enclosed thereby into sealing engagement with the marginal areas of the portion of the lowermost sheet associated therewith, separating the packaged products and dies, furthering crystallization of said film, and separating the packaged products from the excess material of said sheets.

8. The method of forming a hermetically sealed package which comprises: extruding two separate continuous sheets of polyvinylidene chloride film, one of said sheets being wider than the other, immediately supercooling said sheets to retard crystallization of said film by immediately passing said sheets through a water bath maintained at a temperature within the range of about 35° to 90° F., passing said sheets through a tempering water bath maintained at a temperature of about 130° F. or less to induce crystallization of said film to an extent that the supercooled properties are retained while further short time heating will substantially crystallize said film, conveying said sheets in vertically spaced relation to a product loading zone with the wider sheet positioned above the other sheet, the lower sheet having portions thereof associated with spaced dies provided with product receiving cavities, said dies being continuously passed through said zone and each receiving a product therein placed on the top surface of said lower sheet and stretching the same downwardly to fill the cavity while retaining marginal portions for sealing with the upper sheet, moving said upper sheet into non-contacting covering relation with the spaced products by covering said die cavities with separate overhead dies to completely enclose said product and the portions of said sheets associated therewith, drawing a vacuum within each of the paired dies to evacuate the area surrounding the product while maintaining separation between the enclosed portions of said sheets, washing the product in each of the paired dies with nitrogen, evacuating each of the paired dies intermediate said sheet portions to draw the portion of the upper sheet enclosed thereby into sealing engagement with the marginal areas of the portion of the lower sheet associated therewith, separating the packaged products and dies, furthering crystallization of said film, separating the packaged products from the excess material of said sheets, and reusing said excess material in the continuous extrusion of said sheets.

9. A method of packaging including extruding spaced sheets of polyvinylidene chloride film, immediately supercooling said sheets under temperature conditions within the range of about 35° to 90° F. to retard crystallization of said film, inserting a product between said sheets, evacuating the area surrounding said product and between said sheets, contacting portions of said sheets to enclose said product while said sheets are still in a supercooled state and completing maximum obtainable crystallization of said film.

10. A method of packaging including extruding spaced sheets of polyvinylidene chloride film, immediately supercooling said sheets by bringing the temperature thereof within a range of about 35° to 90° F. to retard crystallization of said film, raising the temperature of said sheets to within the range of about 115° to 150° F. to induce crystallization of said films while retaining supercooled properties thereof, inserting a product between said sheets, evacuating the area surrounding said product and between said sheets, contacting portions of said sheets to enclose said product while said sheets are still in a supercooled state, and completing maximum obtainable crystallization of said film.

11. Package forming apparatus for use with polyvinylidene chloride film in its supercooled state, said apparatus including die forming means defining a die cavity for receiving therein spaced sheet portions of said film having a product interposed therebetween to completely enclose the same, package evacuation means connected to said die forming means and in communication with the interior of said die cavity, said evacuation means including a valve arrangement providing for evacuation of said die cavity between said sheet portions and around said product during which the sheet portions therein are at first maintained in separated relation and subsequently brought by variation of the vacuum impressed by said evacuation means into product enclosing relation for self-sealing action as a result of their supercooled properties, and film crystallization means receiving the sealed package subsequent to the formation thereof.

12. Product packaging apparatus including a polyvinylidene chloride film extruder adapted to form spaced continuous sheets of said film, conveying means for passing said sheets in spaced realtion through a supercooling bath, further conveying means for passing said sheets from said bath into a package forming apparatus including an upper and lower continuous die-carrying means, the upper and lower dies of said die-carrying means being continuously movable temporarily into closed diecavity formation realtion and each die cavity formed thereby having received therein a portion of each of said sheets in spaced relation and a product interposed therebetween, die cavity evacuation means connected to and forming a part of each of the upper dies, said evacuation means including a valve arrangement whereby said die cavities are evacuated and the sheet portions therein are at first maintained in separated relation during evacuation and subsequently brought into product enclosing relation for self-sealing action as a result of the self-sealing properties of said film, said lower die-carrying means extending beyond said upper die-carrying means and adapted to carry the finished packages into association with a separate upper die-carrying means for furthering crystallization of said film, the dies of the last named upper die-carrying means cooperating with said lower dies to close the same and heat said film to crystallization temperatures, and package removal means beyond said lower die-carrying means for receiving the packages therefrom and separating the same from said continuous sheets.

13. Product packaging apparatus including a polyvinylidene chloride film extruder adapted to form spaced continuous sheets of said film, conveying means for passing said sheets in spaced relation through a supercooling bath, further conveying means for passing said sheets from said bath into a package forming apparatus including an upper and lower continuous die carrying means, the upper and lower dies of said die carrying means being continuously movable temporarily into closed die cavity formation relation and each die cavity formed thereby having received therein a portion of each of said sheets in spaced relation and a product interposed therebetween, die cavity evacuation means connected to and forming a part of each of the upper dies, said evacuation means including a single rotary valve member centrally positioned relative to said upper dies and operatively interconnected with each of the same through flexible conduits, said valve member functioning in synchronized relation to the continuous movement of said upper and lower dies to evacuate the same and at first maintain the sheet portions therein in separation during evacuation and subsequently bring the same into product enclosing relation for self-sealing action as a result of the self-sealing properties of said film, said lower die carrying means extending beyond said upper die carrying means and adapted to carry the finished packages into association with a separate upper die carrying means for furthering crystallization of said film, the dies of the last named upper die carrying means cooperating with said lower dies to close the same and heat said film to crystallization temperatures, and package removal means beyond said lower die carrying means for receiving the packages therefrom and separating the same from said continuous sheets.

14. The apparatus of claim 12 wherein said package removal means includes a reciprocating cutting die which on movement toward the joined continuous sheets successively surrounds each finished package and separates the same while retaining sheet continuity, and shredder means through which said sheets following the removal of packages therefrom are passed to condition the same for reuse in said extruder.

15. The apparatus of claim 13 wherein said package removal means includes a reciprocating cutting die which on movement toward the joined continuous sheets successively surrounds each finished package and separates the same while retaining sheet continuity, and shredder means through which said sheets following the removal of packages therefrom are passed to condition the same for reuse in said extruder.

16. A package forming die for use with polyvinylidene chloride film, said die including top and bottom die members adapted to receive therebetween spaced sheet portions of said film in its supercooled condition, said bottom die member having an upwardly opening cavity therein adapted to receive a product placed on the top surface of the lowermost sheet portion for positioning said lowermost sheet portion in contact with the bottom surface of said cavity, the bottom surface of said top die member being substantially flat and being adapted to receive thereagainst the uppermost sheet portion and completely enclose the cavity of said bottom die member, sealing means acting between said die members to seal said cavity, and separate passageways in said die members in communication with the top surface of said uppermost sheet portion and said cavity intermediate said sheet portions.

17. Product packaging apparatus including a polyvinylidene chloride film extruder adapted to form spaced continuous sheets of said film, conveying means for passing said sheets in spaced relation through a supercooling bath, further conveying means for passing said sheets from said bath into a package forming apparatus including cooperating die forming means, means for moving said die forming means temporarily into closed die-cavity formation relation and each die cavity formed thereby having received therein a portion of each of said sheets in spaced relation and a product interposed therebetween, die cavity evacuation means connected to and forming a part of said die forming means whereby said die cavities are evacuated and the sheet portions therein are at first maintained in separated relation during evacuation and subsequently brought into product enclosing relation for self-sealing action as a result of the self-sealing properties of said film, finished package support means extending beyond said die forming means and adapted to carry the finished packages into association with film crystallization means, and package removal means beyond said film crystallization means for receiving the packages therefrom and separating the same from said continuous sheets.

18. A method of packaging including extruding spaced sheets of polyvinylidene chloride film, immediately supercooling said sheets to retard crystallization of said film, inserting a product between said sheets, contacting portions of said sheets to completely enclose said product, and inducing crystallization of said film to reduce the supercooled properties thereof to a degree that the package formed may be handled without undue coherence and adherence.

19. A method of packaging including extruding a plurality of spaced sheets of polyvinylidene chloride film, immediately supercooling said sheets to retard crystallization of said film, combining said sheets to form a pair of spaced laminates, inserting a product between said laminates, contacting portions of said laminates to completely enclose said product, and inducing crystallization of said film to reduce the supercooled properties thereof to a degree that the package formed may be handled without undue coherence and adherence, the sheets of each laminate exhibiting individually different physical properties to impart improved unitary properties to said laminate.

20. The method of claim 19 wherein one of the sheets of each laminate provides the physical property of resistance to oxygen transmission and another of said sheets provides the physical properties of substantial flexibility and strength even under low temperature conditions.

21. The method of claim 19 wherein at least one of said laminates is partially stretched over said product to an extent to accurately conform and shape itself to the surface contour of said product.

22. A method of packaging comprising extruding at least one sheet of polyvinylidene chloride film, immediately supercooling said sheet to retard crystallization of said film, depositing in spaced relationship a series of articles to be packaged on separate sheet material for use in forming one sidewall of completed packages, marginal portions of said sheet material about said articles being exposed to provide sealing surfaces to form a seal with said supercooled sheet upon contact therewith, moving said supercooled sheet over said sheet material into registration therewith and with said articles, deforming spaced areas of said supercooled sheet over said articles to enclose the same with said sheet material, and contacting portions of said supercooled sheet with the sealing surfaces of said sheet material to complete said packages.

23. A method of packaging comprising extruding at least one sheet of polyvinylidene chloride film, immediately supercooling said sheet to retard crystallization of said film, depositing in spaced relationship a series of articles to be packaged on separate sheet material for use in forming one sidewall of completed packages, marginal portions of said sheet material about said articles being exposed to provide sealing surfaces to form a seal with said supercooled sheet upon contact therewith, moving said supercooled sheet over said sheet material into registration therewith and with said articles, deforming spaced areas of said supercooled sheet over said articles to enclose the same with said sheet material, contacting portions of said supercooled sheet with the sealing surfaces of said sheet material to complete said packages, and inducing crystallization of said film to reduce the supercooled properties thereof to a degree that the packages formed may be handled without undue coherence and adherence.

24. A method of packaging comprising extruding at least one sheet of polyvinylidene chloride film, immediately supercooling said sheet to retard crystallization of said film, depositing in spaced relationship a series of articles to be packaged on separate sheet material for use in forming one sidewall of completed packages, marginal portions of said sheet material about said articles being exposed to provide sealing surfaces to form a seal with said supercooled sheet upon contact therewith, moving said supercooled sheet over said sheet material into registration therewith and with said articles, deforming spaced areas of said supercooled sheet over said articles to enclose the same with said sheet material, contacting portions of said supercooled sheet with the sealing surfaces of said sheet material to complete said packages, inducing crystallization of said film to reduce the supercooled properties thereof to a degree that the packages formed may be handled without undue coherence and adherence, and subdividing said sheet material and polyvinylidene chloride sheet between said articles to separate said packages.

25. The method of claim 22 wherein said supercooled sheet is partially stretched over said articles to an extent to accurately conform and shape itself to the surface contour of said articles.

26. The method of claim 23 wherein said supercooled sheet is partially stretched over said articles to an extent to accurately conform and shape itself to the surface contour of said articles.

27. A method of packaging comprising extruding a plurality of separate sheets of polyvinylidene chloride film, immediately cooling said sheets to retard crystallization of said film, combining said sheets to form at least one laminate, depositing in spaced relationship a series of articles to be packaged on separate sheet material for use in forming one sidewall of completed packages, marginal portions of said sheet material about said articles being exposed to provide sealing surfaces to form a seal with said laminate upon contact therewith, moving said laminate over said sheet material into registration therewith and with said articles, deforming spaced areas of said laminate over said articles to enclose the same with said sheet material, and contacting portions of said laminate with the sealing surfaces of said sheet material to complete said packages, the sheets of said laminate exhibiting individually different physical properties to impart improved unitary properties to said laminate.

28. The method of claim 27 wherein one of the sheets of said laminate provides the physical properties of resistance to oxygen transmission and another of said sheets provides the physical properties of substantial flexibility and strength even under low temperature conditions.

29. The method of claim 27 wherein said laminate is partially stretched over said article to an extent to accurately conform and shape itself to the surface contour of said articles.

30. A method of packaging comprising extruding a plurality of separate sheets of polyvinylidene chloride film, immediately supercooling said sheets to retard crystallization of said film, combining said sheets to form at least one laminate, depositing in spaced relationship a series of articles to be packaged on separate sheet material for use in forming one sidewall of completed packages, marginal portions of said sheet material about said articles being exposed to provide sealing surfaces to form a seal with said laminate upon contact therewith, moving said laminate over said sheet material into registration therewith and with said articles, deforming spaced areas of said laminate over said articles to enclose the same with said sheet material, contacting portions of said laminate with the sealing surfaces of said sheet material to complete said packages, inducing crystallization of said film to reduce the supercooled properties thereof to a degree that the packages formed may be handled without undue coherence and adherence, and subdividing said sheet material and laminate between said articles to separate said packages, the sheets of said laminate exhibiting individually different physical properties to impart improved unitary properties to said laminate.

31. The method of claim 30 wherein one of the sheets of said laminate provides the physical property of resistance to oxygen transmission and another of said sheets provides the physical properties of substantial flexibility and strength even under low temperature conditions.

32. The method of claim 30 wherein said laminate is partially stretched over said articles to an extent to accurately conform and shape itself to the surface contour of said articles.

33. The method which comprises bringing opposed surfaces of a normally crystalline vinylidene chloride polymer in the supercooled, noncrystalline condition into contact with one another at a temperature in the range from 20° to 45° C. and under sufficient pressure to fuse the said surfaces together in the area of contact.

34. The method claimed in claim 1, wherein the operating temperature is near 30° to 35° C.

(References on following page)

References Cited by the Examiner

UNITED STATES PATENTS

| | | | |
|---|---|---|---|
| 2,116,995 | 5/38 | Bickford | 53—112 X |
| 2,145,941 | 2/39 | Maxfield | 53—22 |
| 2,147,384 | 2/39 | Salfisberg | 206—46 |
| 2,155,445 | 4/39 | Pittenger et al. | 53—22 X |
| 2,257,823 | 10/41 | Stokes | 53—27 |
| 2,349,511 | 5/44 | Miller | 53—20 X |
| 2,387,812 | 10/45 | Sommeborn et al. | 53—22 |
| 2,432,373 | 12/47 | Bleam et al. | 53—22 |
| 2,503,518 | 4/50 | Slaughter | 53—20 |
| 2,530,306 | 11/50 | Land | 53—28 |
| 2,536,773 | 1/51 | Saidel. | |
| 2,557,794 | 6/51 | Nicolle | 206—46 |
| 2,597,041 | 5/52 | Stokes | 53—141 |
| 2,676,440 | 4/54 | Campbell | 53—22 |
| 2,679,968 | 6/54 | Richter | 101—426 X |
| 2,690,593 | 10/54 | Abercrombie | 53—22 |
| 2,692,074 | 10/54 | Mueller et al. | 53—112 |
| 2,769,206 | 11/56 | Cheney et al. | |
| 2,878,154 | 3/59 | Cheney et al. | 53—40 X |

FRANK E. BAILEY, *Primary Examiner.*

EARLE DRUMMOND, ROBERT A. LEIGHEY,
  *Examiners.*